United States Patent Office 3,238,011
Patented Mar. 1, 1966

3,238,011
DRYCLEANING PROCESS AND COMPOSITIONS
Augustine Hicks Lawrence, Jr., and John Herbert Dowling, Wilmington, Del., assignors to E. I. du Pont de Nemours and Company, Wilmington, Del., a corporation of Delaware
No Drawing. Filed July 2, 1962, Ser. No. 207,103
11 Claims. (Cl. 8—142)

This invention relates to a new and improved process for drycleaning textiles and novel chlorofluoroethane-emulsifier compositions for this use. It relates specifically to a drycleaning process and solvent-emulsifier composition suitable for use in coin-operated drycleaning machines.

It has been previously disclosed in patent application S.N. 72,279, filed on November 29, 1960, now U.S. Patent No. 3,042,479 issued July 3, 1962, of which this application is a continuation-in-part, that certain chlorofluorohydrocarbons containing not more than two carbon atoms and at least one fluorine atom with freezing points below 0° C. and boiling points in the range 8 to 75° C. make good drycleaning fluids when employed with up to 2% by weight of a drycleaning emulsifying agent. The agents employed may include such materials as iso-octylene polyethylene glycols, amine salts of dodecylbenzene sulfonic acids and tetrakis-(2-hydroxypropyl)-ethylenediamine ester of oleic acid quaternized with dimethyl sulfate.

It is the object of this invention to provide a drycleaning solvent-emulsifier composition suitable for coin-operated drycleaning machines at ordinary temperatures and pressures whose use will give clean, dry garments possessing a soft, non-boardy hand with low emulsifier consumption. It is a further object to provide clear concentrated solvent emulsifier compositions containing from 5% to 50% by weight of dissolved emulsifier for use in maintaining a critical emulsifier concentration in the working solvent composition. It is a still further object to provide a drycleaning process in which the emulsifier content of the solvent can be controlled to produce clean garments having a low substantive emulsifier content and a soft pleasing hand.

The above objectives are attained by employing a drycleaning composition consisting essentially of a completely halogenated chlorofluoroethane boiling in the range 30° to 100° C. which contains, as an emulsifier and textile softener, a combination of partially esterified and partially quaternized N,N,N',N'-tetrakis-(2-hydroxypropyl)-ethylenediamines maintained at a concentration in the range 0.05 to 0.5% during cleaning use by addition of a more concentrated solvent-emulsifier composition which may contain up to about 50% by weight of the mixed tetrakis-(2-hydroxypropyl)-ethylenediamine derivatives.

The preferred emulsifying-softener combination consists of N,N,N',N'-tetrakis-(2-hydroxypropyl)-ethylenediamine which has been esterified with about two molecular proportions of oleic acid and quaternized with about 0.7 to about 1.7, preferably 0.9 to 1.3, molecular proportions of dimethyl sulfate. This produces an emulsifying combination containing molecules having varying degrees of esterification and quaternization. Partial esterification with oleic acid is essential to produce the desired emulsifying properties of the agent. Partial quaternization with dimethyl sulfate is essential to produce the substantive softening properties whereby the agent is adsorbed by the textile fibers so that the cleaned fabric will have a soft hand and not be boardy or stiff as a result of the cleaning process. Complete esterification would give a product with no free hydroxyl groups. These unesterified hydroxyl groups assist in making it possible for the composition to hold small concentrations of water, a factor essential in the drycleaning process for best results. A 0.1% concentration of the preferred emulsifying combination raises the concentration of water that can be carried by the solvent. In the case of 1,2,2-trichloro-1,1,2-trifluoromethane, 0.1% of the emulsifying combination raises the water saturation value from 0.008% to 0.020%. Complete quaternization of the emulsifying combination would give a product that would have little or no solubility in the drycleaning solvent employed.

The emulsifying combination of this invention is unique in that it is both substantive and highly soluble so that solutions containing up to 50% by weight of the combination may be obtained in the chlorofluoroethane solvent. Homogeneous concentrated solutions of the emulsifying agent are essential for maintaining requisite agent concentrations in the working solvent without danger of encountering heterogeneous compositions and without using special agitation and dissolving tanks to replenish the adsorbed agent.

The emulsifying-softener combination of this invention is also unique in that it will produce a satisfactory hand and satisfactory drycleaning when present to the extent of only 0.05 to 0.5% by weight in the solvent used, the preferred concentration range being about 0.08 to 0.15%. About 5 to 10 times this concentration is usually required to secure combined cleaning and softening effects with other agents. In addition, the emulsifying combination is unique in that it possesses both anti-static and bacteriostatic activity.

A synergetic combination of both emulsifying combination and solvent also contributes to the novelty of invention. A 0.1% solution of the emulsifying combination in, for example, 1,1,2-trichloro-1,2,2-trifluoroethane is comparable in its cleaning behavior to commercial drycleaning systems containing an approxiamtely 1% detergent concentration in perchlorethylene.

The fully halogenated chlorofluoroethane fluids have been found to provide the desired characteristics in the drycleaning combination of this invention. Of these, the solvents boiling in the range 30 to 100° C. have been found to be suitable and those boiling in the range 40 to 50° C. are preferred for practical purposes. A solvent composition which does not freeze at ordinary temperatures or boil below 30° C. is desired but this does not bar the use of combinations of solvents wherein the combination does not freeze or boil in use at temperatures of 0° to 30° C. The preferred solvent for the process is 1,1,2-trichloro-1,2,2-trifluoroethane which boils at 48° C. and freezes at —35° C. Other suitable solvents include 1,1,2,2-tetrachloro-1,2-difluoroethane (B.P. 93° C., F.P. 24° C.); 1,1,1-trichloro-2,2,2-trifluoroethane (B.P. 46° C., F.P. 14° C.) and 1,2-dichloro-1,1,2,2-tetrafluoroethane (B.P. 4° C., F.P. —94° C.).

For good drycleaning results, it has been found that maintenance of the concentration of the emulsifier combination in the solvent is critical. Too low a concentration will impair cleaning and the garments will be rough and boardy. Too high a concentration will give the garments an odor and they will be lacking in body and have an undesirable droopy quality. In this connection, it has been discovered that a concentration range of 0.05 to 0.5% is suitable but that for best results the solution must be maintained in the range 0.08 to 0.15%. To maintain the proper concentration of the emulsifier in the drycleaning solvent combination, use of an emulsifier concentrate is essential. A small percentage of solvent is lost through handling in the drycleaning process and a larger percentage of the emulsifier combination is lost due to its substantive absorption by the garments cleaned. Processes in which the solvent is completely vaporized require a relatively high concentration of emulsifier combination so that the proper concentration may be maintained without increasing the volume of cleaner handled by the apparatus unit or units involved. Accordingly concentrates containing from about 0.5% to 50% are required. In general concentrates containing about 7.5% have been found essential where solvent is reused without complete vaporization and recovery and concentrates of about 20–40% are needed when the solvent is vaporized and recovered as substantially pure solvent. For this purpose, a unique emulsifier-softener combination capable of giving clear, mobile solutions at concentrations up to about 50% is necessary. As was previously noted, a quaternized cationic substantive textile softener is normally of low solubility in organic solvents and the solvent-emulsifier combination of this invention is unique.

The following example is illustrative:

*Example*

Into a typical automatic washer-dryer combination was placed 7 pounds of a wide variety of soiled garments of different textiles and the washer-tub then loaded with 65 pounds of 1,1,2-trichloro-1,2,2-trifluoroethane to which were added approximately one-third pound by weight of a 20% by weight solution of N,N,N',N'-tetrakis-(2-hydroxypropyl)-ethylenediamine which had been esterified with 2 mole proportions of oleic acid per mole and quaternized with 1.2 molar proportions of dimethyl sulfate, in 1,1,2-trichloro-1,2,2-trifluoroethane. The effective washing composition is then 0.1% (by wt.) of the emulsifier combination in the solvent. Prior to cleaning, any food spots and stains found on the garments were given a light pre-misting with water.

After cleaning, the garments removed from the washer were essentially free of general soil, oil and grease stains, food spots and stains, and were bright in appearance, possessed a desirable hand and were dry and wrinkle-free.

Although the drycleaning solvent-emulsifier combination of this invention may be employed in any drycleaning process, its unique properties are particularly advantageous for use in coin-operated drycleaning machines where the customer waits until the cleaning and drying of the garments has been completed. For this purpose, low boiling chlorofluoroethane solvents which are liquid at room temperature are specially desirable because they can be quickly evaporated and are relatively non-toxic and non-inflammable. The solvents of this type which boil above 30° C. can be employed at atmospheric pressure and the need for pressures well above or well below this value does not exist so that heavy apparatus of the type needed to meet such contingencies is not required. However, these chlorofluoroethane solvents have relatively mild solvent characteristics and must be used in cooperation with a suitable emulsifier. Emulsifiers which are also good softening agents are substantively absorbed by textiles. Since all amulsifiers are relatively expensive, substantive absorption may add considerably to the cost of the cleaning process. This is particularly noteworthy since relatively large amounts of softeners are normally required to produce this effect. Furthermore, absorption of large quantities of nitrogenous agents often leaves the treated goods with an undesirable odor and other unsatisfactory properties as previously noted. The composition and process of this invention is dependent upon a novel combination of solvent with an emulsifier which is also a textile softener and which though highly soluble in the solvent is effective at extremely low concentrations.

It will be appreciated that modifications in the process and compositions of this invention may be made without departing from the heart of the invention as defined. Under some instances addition of small concentrations of blending agents may be added to further increase the water-carrying quality of the emulsifier-solvent combination. Organic compounds such as alkylene glycols, polyglycols, polyglycol esters, polyol esters and some alcohols are suitable. In addition, traces of odorants may be added to give a positive pleasant odor to the cleaned garments or to overcome any accidental conditions in which too much emulsifier is present.

What is claimed is:

1. A process for drycleaning textile fibers and other garment materials which comprises washing said material with a drycleaning liquid comprising an emulsifier-solvent combination consisting essentially of a completely substituted cholorfluoroethane solvent which does not boil at a temperature less than about 30° C. and an emulsifier combination comprising a partially oleated N,N,N',N' - tetrakis - (2-hydroxypropyl)-ethylenediamine containing an average of two ester groups per mole and in quaternary combination with about 0.7 to 1.7 molecular proportions of dimethyl sulfate, said combination containing 0.05 to 0.5% of the emulsifier combination which is maintained in the said concentration.

2. The process of claim 1 in which the critical concentration range of the emulsifier combination in the drycleaning liquid is maintained by periodic addition of an emulsfier-solvent concentrate containing 5 to 50% by weight of the emulsifier combination in the completely substituted chlorofluoroethane solvent to the recovered drycleaning liquid.

3. A process for drycleaning textile fibers and other garment materials which comprises washing said material with a drycleaning liquid comprising an emulsifier-solvent combination consisting essentially of a completely substituted chlorofluoroethane solvent which does not boil at a temperature less than about 30° C. and an emulsifier combination comprising a partially oleated N,N,N',N'-tetrakis-(2-hydroxypropyl) - ethylenediamine containing an average of two ester groups per mole and in quaternary combination with about 0.9 to 1.3 molecular proportions of dimethyl sulfate, said combination containing 0.08 to 0.15% of the emulsifier combination which is maintained in the said concentration.

4. The process of claim 3 in which the critical concentration range of the emulsifier combination in the drycleaning liquid is maintained by periodic addition of an emulsifier-solvent concentrate containing 5 to 50% by weight of the emulsifier combination in the completely substituted chlorofluoroethane solvent to the recovered drycleaning liquid.

5. A solvent-emulsifier combination comprising 0.05 to 0.5% of an emulsifier-combination comprising a partially oleated N,N,N',N' - tetrakis - (2-hydroxypropyl)-ethylenediamine containing an average of two ester groups per mole and in quaternary combination with about 0.7 to 1.7 moles of dimethyl sulfate, the balance consisting essentially of a completely substituted trichlorotrifluoroethane solvent composition which does not boil at a temperature less than about 30° C. at ordinary pressures.

6. A solvent-emulsifier combination comprising 0.08 to 0.15% of an emulsifier-combination comprising a partially oleated N,N,N',N' - tetrakis - (2-hydroxypropyl)-ethylenediamine containing an average of two ester groups per mole and in quaternary combination with about 0.9 to 1.2 moles of dimethyl sulfate, the balance consisting essentially of a completely substituted trichlorotrifluoroethane solvent composition which does not boil at a temperature less than about 30° C. at ordinary pressures.

7. The composition of claim 6 in which the solvent consists essentially of 1,1,2-trichloro-1,1,2-trifluoroethane.

8. A solvent-emulsifier concentrate consisting of 0.5 to 50% of an emulsifier combination comprising a partially oleated N,N,N',N' - tetrakis - (2 - hydroxypropyl)-ethylenediamine containing an average of two ester groups per mole and in quaternary combination with about 0.9 to 1.2 moles of dimethyl sulfate, the balance consisting essentially of a completely substituted trichlorotrifluoroethane solvent composition which does not boil at a temperature less than about 30° C. at ordinary pressures.

9. The concentrate of claim 8 in which the solvent consists essentially of 1,1,2-trichloro-1,2,2-trifluoroethane.

10. A solvent-emulsifier concentrate consisting of 20–40% of an emulsifier combination comprising a partially oleated N,N,N',N' - tetrakis - (2 - hydroxypropyl)-ethylenediamine containing an average of two ester groups per mole and in quaternary combination with about 0.9 to 1.2 moles of dimethyl sulfate, the balance consisting essentially of a completely substituted trichlorotrifluoroethane solvent composition which does not boil at a temperature less than about 30° C. at ordinary pressures.

11. The concentrate of claim 10 in which the solvent consists essentially of 1,1,2-trichloro-1,2,2-trifluoroethane.

References Cited by the Examiner
UNITED STATES PATENTS

| | | | |
|---|---|---|---|
| 2,639,599 | 5/1953 | Wellford | 68—18.2 |
| 2,878,144 | 3/1959 | Conbere | 117—139 |
| 3,042,479 | 7/1962 | Lawrence et al. | 8—142 |

NORMAN G. TORCHIN, *Primary Examiner.*

ABRAHAM H. WINKELSTEIN, *Examiner.*

Disclaimer 3,238,011.—*Augustine Hicks Lawrence, Jr.*, and *John Herbert Dowling*, Wilmington, Del. DRYCLEANING PROCESS AND COMPOSITIONS. Patent dated Mar. 1, 1966. Disclaimer filed Apr. 14, 1970, by the assignee, *E. I. du Pont de Nemours and Company*.

Hereby enters this disclaimer to all the claims of said patent.

[*Official Gazette August 18, 1970.*]